United States Patent [19]

Murase et al.

[11] Patent Number: 5,410,454
[45] Date of Patent: Apr. 25, 1995

[54] DEVICE FOR SUPPLYING INCIDENT LIGHT TO EDGE LIGHT PANELS

[75] Inventors: Shinzo Murase; Hirokazu Matsui, both of Otsu, Japan

[73] Assignee: Meitaku System Co., Ltd., Japan

[21] Appl. No.: 934,199

[22] Filed: Aug. 24, 1992

[30] Foreign Application Priority Data

Aug. 29, 1991 [JP] Japan .................. 3-244434

[51] Int. Cl.⁶ ............................. F21V 8/00
[52] U.S. Cl. .................. 362/31; 362/26; 362/223
[58] Field of Search ............ 362/26, 29, 30, 31, 362/297, 298, 223, 301, 307

[56] References Cited

U.S. PATENT DOCUMENTS

| | | | |
|---|---|---|---|
| 2,524,657 | 10/1950 | Ford | 362/31 |
| 2,646,637 | 7/1953 | Niebenberg et al. | 362/31 |
| 3,140,831 | 7/1964 | Strange | 362/31 |
| 3,497,686 | 2/1970 | Young | 362/31 |
| 4,688,156 | 8/1987 | Suzuki et al. | 362/29 |
| 5,046,826 | 9/1991 | Iwamoto et al. | 362/31 |
| 5,050,946 | 9/1991 | Hathaway et al. | 362/31 |
| 5,178,447 | 1/1993 | Murase et al. | 362/31 |
| 5,211,464 | 5/1993 | Böhmer | 362/31 |

FOREIGN PATENT DOCUMENTS 144381 1/1991 Japan .

Primary Examiner—Ira S. Lazarus
Assistant Examiner—Y. Quach
Attorney, Agent, or Firm—King & Schickli

[57] ABSTRACT

The present invention provides an incident light supply device which enables the intensity of illumination of an edge light illuminator to be drastically increased, while keeping it thin and reducing power consumption. An edge light panel is provided with a mirror frame at the incident end surface side. A reflection mirror is positioned at an angle to the edge light panel, and spaced away from a linear form light source in the thickness direction, whereby a pseudo-light source that is a virtual image of the linear form light source is obtained. This pseudo-light source is used together with the linear form light source as an incident light source. Between the edge light panels there is a spacing zone, to which the linear form light source is opposed in planar alignment. The location of the reflection mirror is determined such that the pseudo-light source is opposed in planar alignment with the incident end surface of each edge light panel. The pseudo-light source produced by the reflected image, has 95% of the reflectivity of the linear form light source. Thus, the intensity of illumination of the edge light illuminator arrangement can be drastically increased by a factor of for example, 2 or 3.

16 Claims, 5 Drawing Sheets

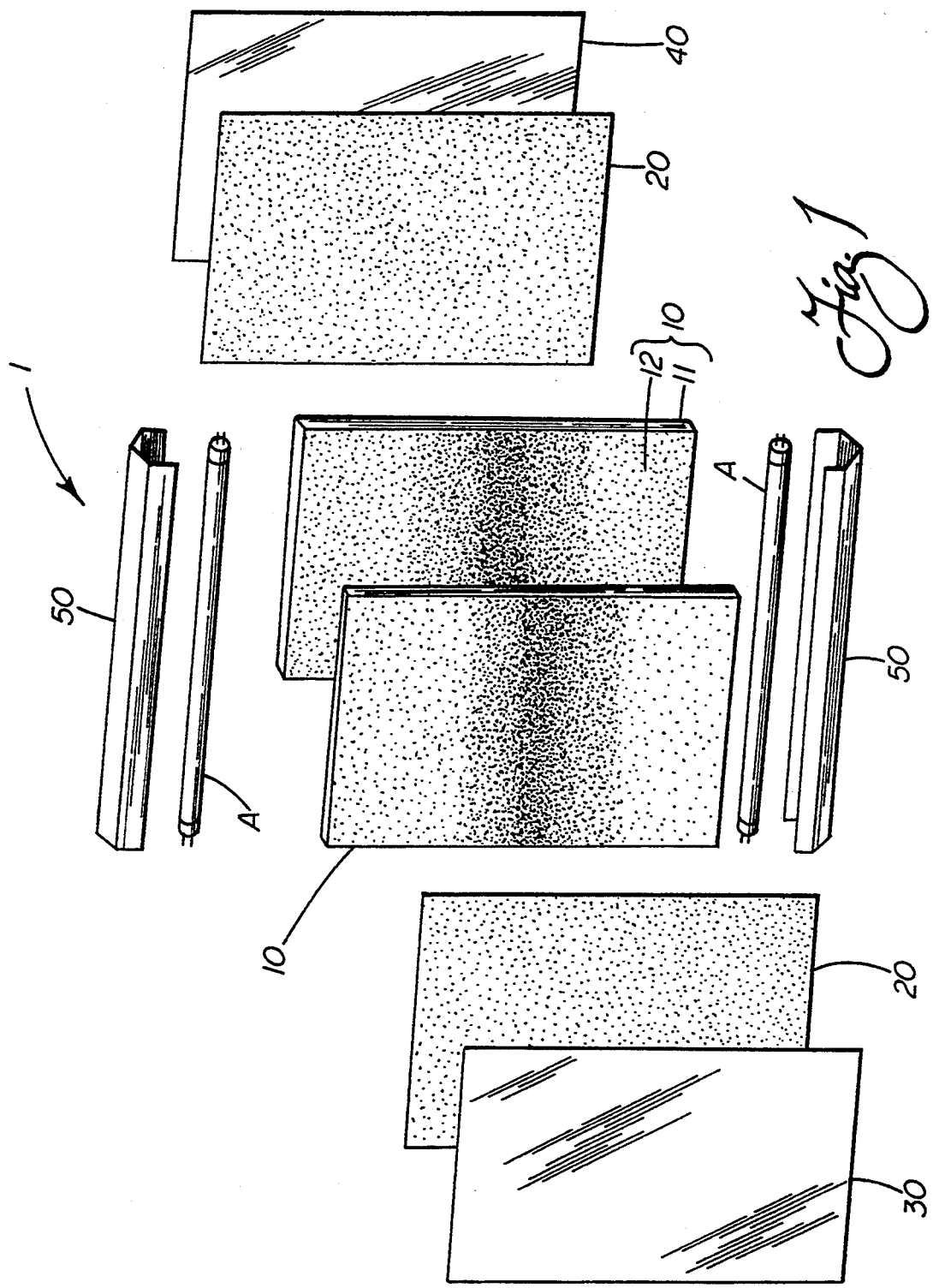

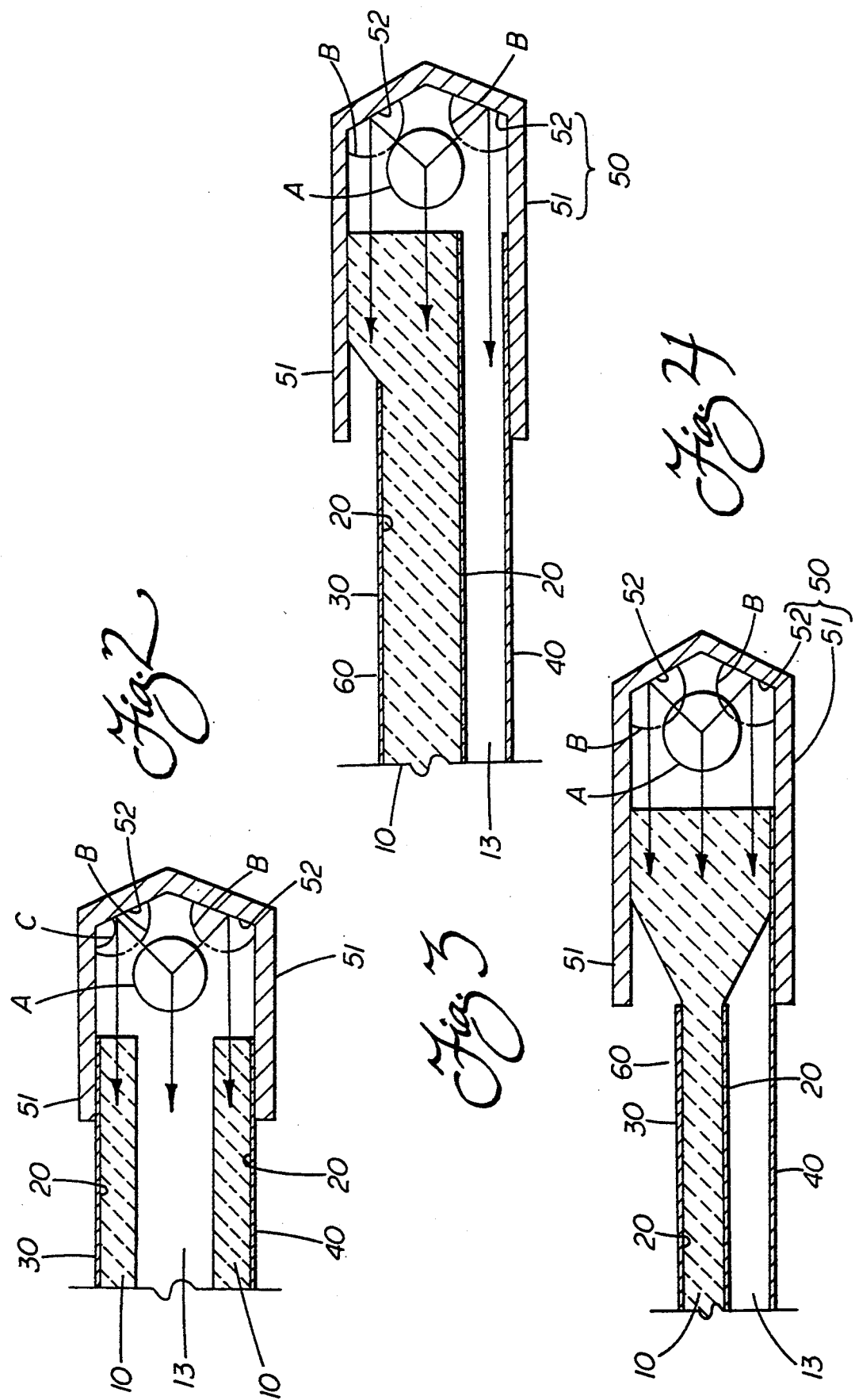

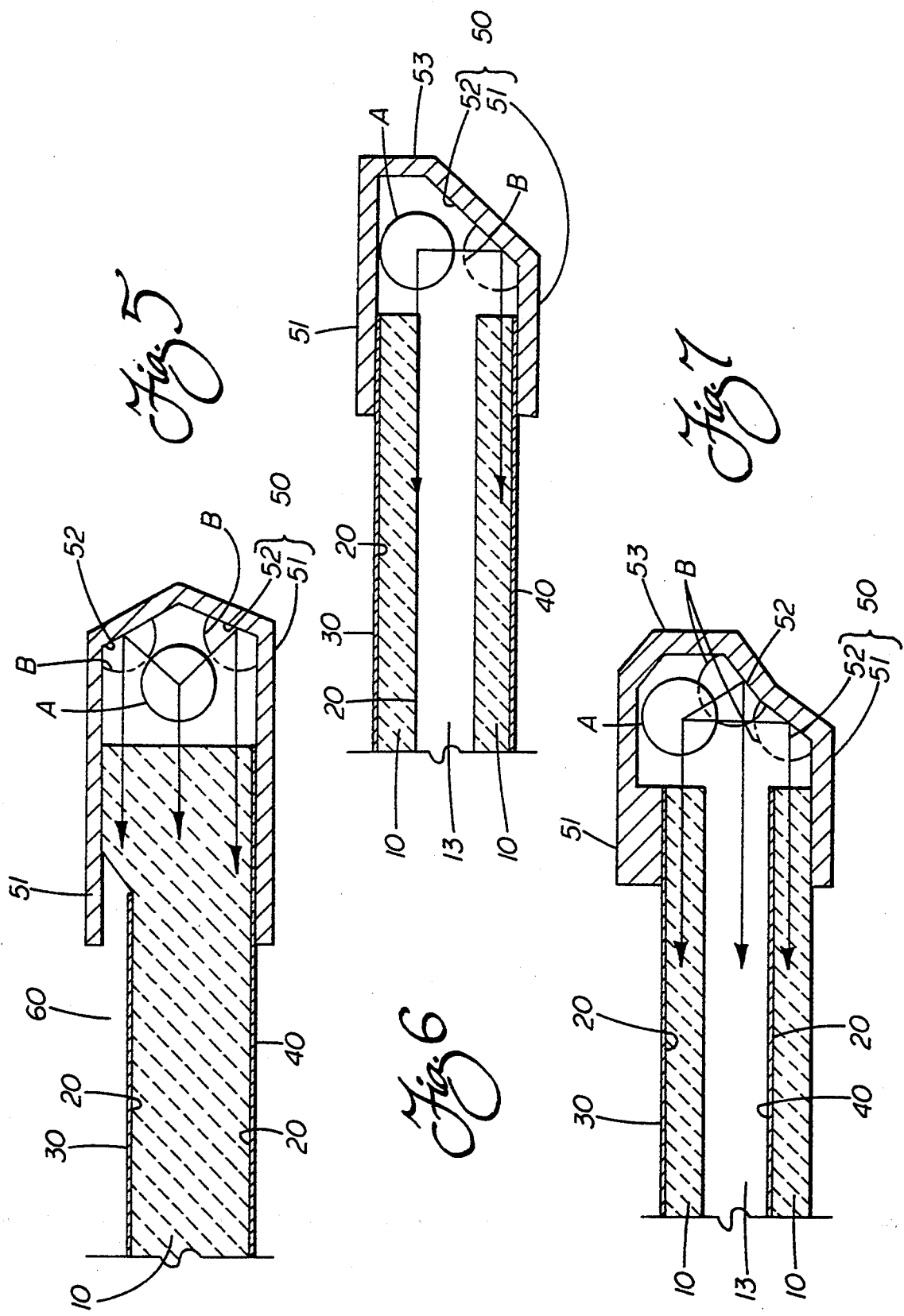

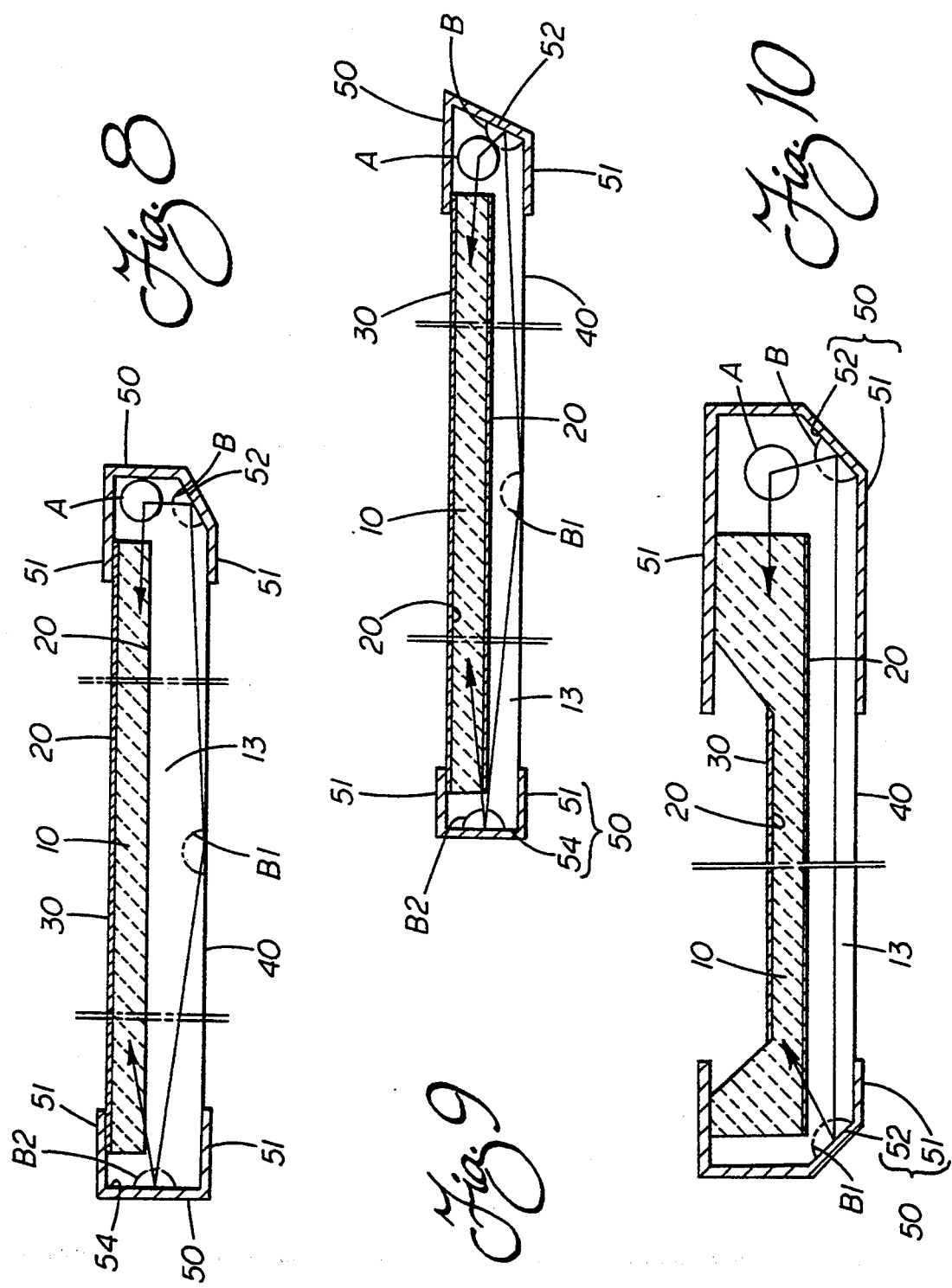

DEVICE FOR SUPPLYING INCIDENT LIGHT TO EDGE LIGHT PANELS

BACKGROUND OF THE INVENTION

1. Field of the Invention

The present invention relates generally to an edge light illuminator arrangement and particularly to a device for supplying incident light to an edge light panel.

2. Prior Art

This type of edge light panel includes a linear form light source on the incident end surface side of the edge light panel for feeding incident light to it.

In order to supply this incident light, use is generally made of reflector means which surrounds the linear form light source. Thus, the incident light supply device is made up of a linear form light source and a reflector or reflection sheet.

This is typically set forth in JP-Kokai-1-90085, according to which the linear form light source is surrounded and covered with reflector means built up of a silver reflection film over a region of 180° to 270° except the incident end surface side of the edge light panel. This incident light supply device is designed to reduce emission of the light emanating from the light source, and to focus the light source light on the incident surface of the edge light panel, whereby the amount of the light incident on the edge light panel can be increased as much as possible. In the art, this may be called the light-focusing system.

Indeed, the incident light supply device relying on this light-focusing system achieves an about 30–40% increase in the luminanee of illumination, when compared with a simple arrangement in which an opposite array of reflectors are used for the incident end surface, and so is excellent in itself. In combination with some improvements in the edge light panel and in the reflection plane, this achieves an average luminanee of, say, 950–1,150 cd/m$^2$, when used as an edge light illuminator for, e.g., a liquid crystal backlight.

This intensity of illumination is particularly well suited for a liquid crystal backlight used in association with a monochromic display panel. However, on the other hand, it provides insufficient light intensity for a liquid crystal backlight used in association with a color display panel, and so its use to this end is almost impossible.

This is because the liquid crystal backlight used in association with a color display panel is required to have an intensity of illumination at least twice or treble, preferably several times as large.

One way, this desired increase in luminance may be achieved is by increasing the number of linear form light sources used. In order to be used with the liquid crystal backlight mentioned above, however, the edge light illuminator should be made as thin as possible. This need for a thin, compact design runs counter to the provision of additional space necessary to increase the number of light sources. Additionally, power saving is also needed so that the equipment may be made more portable. The increase in the number of light sources is again contrary to such power saving and portability concerns, and accordingly, is said to be unsuitable for improving luminance.

In view of such situations as mentioned above, it is therefore an object of this invention to provide an incident light supply device for an edge light panel, which can be thin, save power and attain a drastic increase in the intensity of illumination.

SUMMARY OF THE INVENTION

According to this invention, this object is achieved by the provision of an incident light supply device for an edge light panel, characterized by including:

a linear form light source located on the incident end surface side of the edge light panel, and a reflection mirror which is such spaced away from said linear form light source as to form a mirror reflection pseudo-light source and is located on the edge light panel with an angle therewith in the vicinity of a position displaced in the thickness direction.

Preferably, the reflection mirror includes a single face located in a single plane.

Alternatively, the reflection mirror includes a plurality of faces arranged in a plurality of planes located adjacent to or spaced away from each other.

Preferably, one of the linear form light source and the pseudo-light source is located in a position opposite of the incident end surface of the edge light panel.

Alternatively, one of the linear form light source and the pseudo-light source is located in a position opposite of a spacing zone positioned between two edge light panels or adjacent to the back surface of the edge light panel.

Preferably, the incident end surface of the edge light panel is made thick and wide and the linear form and pseudo-light sources are located in a position opposite of the thus thickened and enlarged incident end surface.

Preferably, the reflection mirror is located having a mirror frame of a curved shape in section. The mirror frame terminates at the edge of the incident end surface of the edge light panel.

According to this invention, the virtual image of the linear form light source on the mirror surface is used as a pseudo-light source. The incident light reflected by the pseudo-light source has an almost identical luminance that may be used as illumination light together with the incident light directly emitted by the linear form light source to illuminate the edge light illuminator. As a result of the additive effect, a high intensity of illumination is provided.

BRIEF DESCRIPTION OF THE DRAWINGS

The incident light supply device for an edge light panel according to this invention will be described, by way of example only, with reference to the accompanying drawings, in which:

FIG. 1 is an exploded, perspective view of the edge light illuminator arrangement, FIG. 2 represents part of that arrangement, FIG. 3 is a longitudinally sectioned view showing part of another embodiment of this invention, FIG. 4 is a longitudinally sectioned view showing part of a further embodiment of this invention, FIG. 5 is a longitudinally sectioned view showing part of a still further embodiment of this invention, FIG. 6 is a longitudinally sectioned view showing part of a still further embodiment of this invention, FIG. 7 is a longitudinally sectioned view showing part of a still further embodiment of this invention, FIG. 8 is a partly cut-away, longitudinally sectioned view showing part of a still further embodiment of this invention, FIG. 9 is a partly cut-away, longitudinally sectioned view showing part of a still further embodiment of this invention, and FIG. 10 is a partly cut-away, longitudinally sectioned view showing part of a still further embodiment of this invention.

DETAILED DESCRIPTION OF THE PREFERRED EMBODIMENTS

Figure 11:
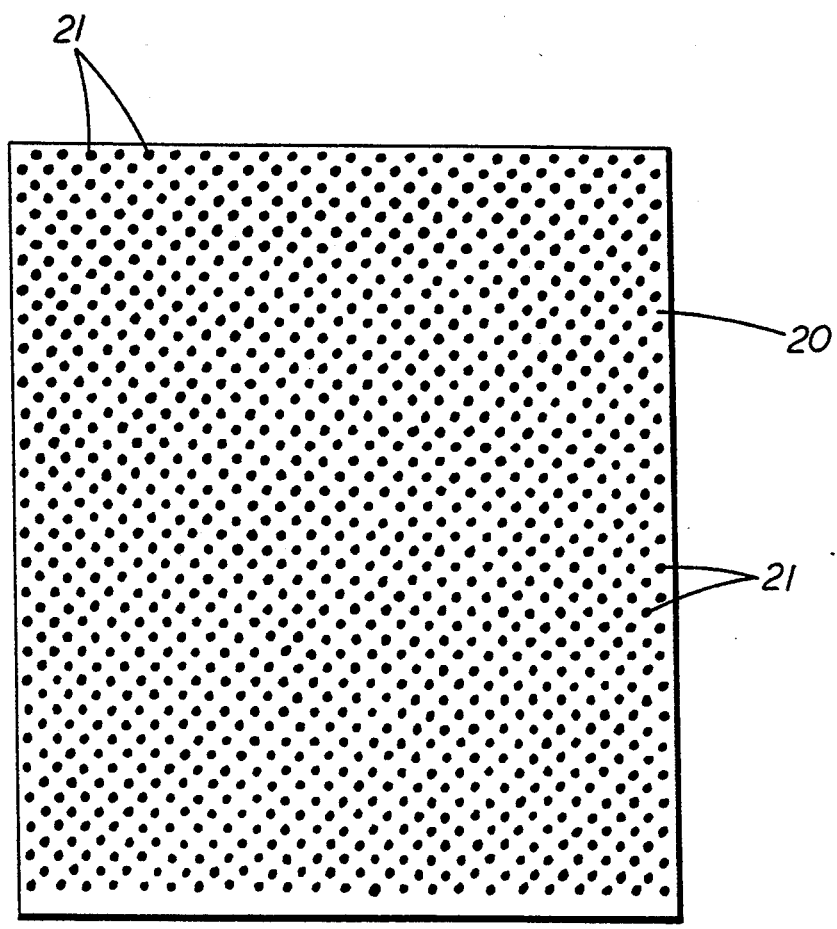
FIG. 11 is a detailed plan view of a back reflection sheet showing the minuscule light-transmitting elements.

Referring now to the drawings, there is shown several embodiments or arrangements of the edge light panel assembly in which reference numeral 1 stands for an edge light illuminator, 10 an edge light panel, 20 a repeatedly reflecting sheet, 30 a diffusing sheet, 40 a reflection sheet, 50 a mirror frame, a linear form light source and B a pseudo-light source (i.e. the reflected image of the linear form light source).

The edge light panel 10 is formed by providing a diffused reflection pattern 12 on an acrylic transparent substrate 11 as thin as 2 mm in thickness by screen printing. The diffused reflection pattern 12 is formed by a matrix form array of equidistant dots. The dot percent is increased in a non-stepwise manner from the linear form light sources A in the in-plane direction, so that the dot percent is maximized at the central region between the light sources A, at which the dots overlap partly with one another.

In the edge light illuminator arrangement 1 according to this embodiment, a pair of edge light panels 10 are spaced away from each other and opposed to each other, so that the diffused reflection patterns 12 are located on the reflection sheets 40 (see FIGS. 1 and 2). Note that a spacing zone 13 between the panels 10 lies in the range of 3 to 4 mm.

As shown, one back reflection sheet 20 is located on the surface diffusing sheet 30 and a second back reflection sheet 20 is in plane contact with the reflection sheet 40.

The repeatly reflecting sheet 20 is formed from a reflection base comprising a mirror sheet by providing a dot or linear array of minuscule light-transmitting elements 2 on the reflection base, thereby making it partly transparent to light all over the surface. Especially in this embodiment or arrangement, the matrix array of dots is located at a uniform density or at an invariable dot percent, as already mentioned, said dots being provided with minuscule through-holes. This construction causes the diffused reflection light, made uniform by the diffused reflection pattern 12 of the edge light panel 10, to be repeatedly reflected, thereby improving the luminance of the surface illuminated.

The linear form light sources A, each made up of a cold-cathode or fluorescent tube of 3 or 4 mm in diameter, corresponding to the central spacing zone 13, are located with that spacing zone 13 disposed between them. The mirror frame 50 overlays the linear form light source A in spaced relation to form a pseudo-light source B.

The mirror frame 50, for example, may be a "Silver Lax" sheet made by Sumitomo MMM Co., Ltd., which is manufactured laminating a silvered polyester film and a protective film onto an aluminium substrate. The resulting frame 50 has a reflectivity of 95% and may be formed into a curved shape in section. In the present embodiment, this mirror frame 50 is built from a pair of side walls 51, terminating at both edges of the side end of each incident end of the edge light panels 10, and a pair of reflection mirrors 52 located between the pair of side walls 51 and contiguous thereto at interior angles of 115° (note selected angle C shown in FIG. 2). These reflection mirrors 52 are spaced away from the linear form light source A and located at angles therewith in the vicinity of a position displaced in the thickness direction.

Thus, the pair of reflection mirrors 52 having a 95% reflectively as mentioned above cause a virtual image of the linear form light source A to be formed by 95% reflection of the light from the linear form light source A at a position opposite to the incident end surface of each edge light panel 10, thereby providing a pair of pseudo-light source B for the edge light panel 10.

In the edge light illuminator arrangement 1 according to the present embodiment, the repeatedly reflecting sheet 20 mentioned above enables the quantity of light leaving the minuscule light-transmitting elements to be increased. This is accomplished by the back reflection of the diffused reflection light. Specifically, the reflection mirror 52 functions to repeatedly reflect and direct light over the surface to be illuminated thereby achieving an illuminance twice or more as large as that would be obtained in the absence of the mirror. In addition, the pseudo-light sources B formed by the reflection mirror 52 mentioned above increase the quantity of incident light supplied as much as possible, achieving a drastic increase in the intensity of illumination, when compared with the prior art light-focusing system mentioned above.

It is understood that the mirror frame 50 used in the edge light illuminator arrangement 1 according to this invention is as a whole made thin. Thus, for example, the mirror frame 50 may have an average thickness of 1 mm and a maximum thickness of 9 or 10 mm.

Referring then to FIGS. 3–10, there are shown other embodiments of the present invention. In the embodiment shown in FIG. 3, use is made of a mirror frame 50 having a pair of adjacent reflection mirrors 52, as is the case with the first embodiment. However, an edge light panel 10 of 3 mm in thickness is made up of a single sheet The edge light panel has a planar central body section of a first, relatively narrow thickness and an incident end of a second relatively broader or wider thickness. Accordingly, the linear form light source A and one pseudo-light source B fall within an extension of the plane defined by the thickened incident end of the light panel 10. This single sheet is recessed, as shown at 60, on the diffusion sheet side to form a space 60 for receiving a liquid crystal display panel. Between the edge light panel 10 and a reflection sheet 40 there is a spacing zone 13, in which another pseudo-light source B is opposed to the light source A. Note that this arrangement has a maximum thickness of 10 mm.

Similarly, the embodiment shown in FIG. 4 makes use of a mirror frame 50 having a pair of adjacent reflection mirrors 52. However, an edge light panel 10 of 2 mm in thickness is formed by a single sheet, which is made thick and wide on each incident end surface side in both its thickness directions, so that the linear form light source A and both pseudo-light source B fall within an extension of the plane defined by the thickened incident end of the light panel. Again, this single sheet is provided with a space 60 for receiving a liquid crystal display panel on the side of a diffusion sheet 30 and a spacing zone 13 on the side of a reflection side 40.

Note that this arrangement has a maximum thickness of 9 mm.

The FIG. 5 embodiment is similar to that shown in FIG. 3, with the exception that a reflection sheet 40 is closely laminated on the edge light panel sheet through a back reflection sheet 20 without providing any spacing zone 13 on the reflection sheet 40.

In the embodiment shown in FIG. 6, use is made of a similar pair of side walls 51. However, a single reflection mirror 52 extends from one side wall 51 at an interior angle of 110°, and is connected to the other side wall 51 through a wall connector 53. Used with this arrangement are a pair of edge light panels 10, each having a thickness of 2 mm. A linear form light source A is located in association substantially planar alignment with one edge light panel 10 and a spacing zone 13, while a pseudo-light source B is located in association substantially planar alignment with the other edge light panel 10 opposite to the light source A. This arrangement has a maximum thickness of 9 mm.

In the embodiment shown in FIG. 7, a mirror frame 50 comprises a pair of similar side walls 51. However, one reflection mirror 52 extends from one side wall 51 at an interior angle of 125°, and is then joined to a second reflection mirror at an interior angle of 200°. Further, the second reflection mirror 52 is connected to the other side wall 51 through a bent form of connector wall 53. Used with this arrangement are a pair of edge light panels 10, each having a thickness of 2 mm. A linear form light source A is located in association substantially planar alignment with one edge light panel 10, while a pair of pseudo-light sources B are formed by a pair of reflection mirrors 52, one pseudo light source B is disposed in substantially planar alignment with a spacing zone 13 and the other in substantially planar alignment with the opposite edge light panel 10. This arrangement has a maximum thickness of 10 mm.

In all the embodiments or arrangements, the linear form light sources A and the pseudo-light sources B are disposed on both the incident end surface sides of the edge light panels 10. In other words, the identical and symmetrical arrays of the linear form light sources A and reflection mirrors 52 are generally disposed on each incident end surface side. Alternatively, different linear form light sources A and reflection mirrors 52 may be used in any desired combination.

By contrast, FIGS. 8–10 are arrangements, each using a linear form light source A and a pseudo-light source B at one incident end surface side of an edge light panel 10. In each embodiment, the diffused reflection pattern 12 on the edge light panel 10 is defined by dots whose dot percent is varied in a non-stepwise manner from the linear form light source A in the spacing in-plane direction. The dot percent is maximized at a position displaced from the central location of the edge light panel 10 to the non-light source side. Further, the dot percent is decreased in a non-stepwise manner toward the non-light source side, thereby forming a matrix array of dots, similar to that already mentioned.

In the embodiment shown in FIG. 8, a mirror frame 50 having a single reflection mirror 52 is used, and a linear form light source A is located in substantially planar alignment with an edge light panel 10 of 2 mm in thickness and a 3-mm spacing zone 13. A pseudo-light source B is disposed in alignment with the spacing zone 13, and is designed to emit light diagonally for incidence on the longitudinally intermediate portion of a reflection sheet 40 formed by a nonporous sheet, thereby forming a second pseudo-light source $B_1$. On the opposite end of the embodiment, an inverted C-shaped mirror frame 50 is located adjacent the end surface of the edge light panel 10. The mirror frame 50 includes a vertical reflection mirror 54 for defining a third pseudo-light source $B_2$ as reflected by the second pseudo-light source $B_1$. These light sources $B_1$ and $B_2$, which emit light diagonally, enable the incident light to be supplied over the incident end surface side, the lower side of the in-plane central region and the opposite end surface of the edge light panel 10. This arrangement has a maximum thickness of 7 mm.

In the arrangement shown in FIG. 9, a reflection mirror 52 of a mirror frame 50 is interposed between side walls 51, and a linear form light source A is located in opposition to substantially planar alignment with an edge light panel 10 of 2 mm in thickness and a spacing zone 13 of 1.5 mm in thickness. A pseudo-light source B is arranged in the spacing zone 13 such that it emits light diagonally. Otherwise, this arrangement is similar to, but thinner than, that shown in FIG. 8; that is, it has a maximum thickness of 6 mm.

In the arrangement shown in FIG. 10, such a similar mirror frame 50 as used in the arrangement of FIG. 8 is employed. However, an edge light panel 10 of 1.5 mm in thickness is used, which is made thick and wide on the incident and non-incident end surfaces sides. A linear form light source A is located in opposition to substantially planar alignment with the edge light panel 10, while a pseudo-light source B formed by a reflection mirror 52 is substantially aligned with a spacing zone 13. In this way incident light may be supplied in parallel with the reflection sheet 40, thereby forming a pseudo-light source $B_1$ with the reflection mirror 52 of the mirror frame 50 used with the same object. Similarly, this arrangement has a maximum thickness of 8 mm so as to supply incident light within the plane of the edge light panel 10.

While some specific embodiments (arrangements) have been illustrated and explained, it is understood that glass or other mirrors having high reflectivities may be used when carrying out this invention. In view of increasing the quantity of incident light as much as possible, it is preferred that the reflection mirror be formed as a part of the mirror frame. It may be understood, however, that in order to form a pseudo-light source or sources, a reflection mirror or mirrors may be provided on a frame or frames in adjacent or spaced relation.

The location of the reflection mirror may be determined such that the pseudo-light source is opposed to substantially planar alignment with the incident end surface of the edge light panel or the spacing zone between the edge light panels or the edge light panel and the reflection sheet.

As will be appreciated from the above-mentioned arrangements, the provision of the spacing zone is not essential for this invention, but is effective for a luminance increase. This is true of the arrangements set forth in JP-Kokai-3-276185. When a plurality of edge light panels are used, they may be simply laminated together or otherwise arranged for use.

When the incident end surface of the edge light panel is made thick and wide, it is desired that said thick and wide portion be tapered and subject to mirror finish, thereby guiding incident light into the planar central body section effectively while promoting diffused reflection. However, the incident end surface of the edge light panel may be tapered at sharp angles or made vertical.

It is further understood that the present invention is not specifically limited to the embodiments (arrangements) illustrated and described and, when reducing the present invention to practice, many possible modifications may be made to the specific configuration, material, number, size and provision of the edge light panels, linear form light sources, reflection mirrors, pseudo-light sources, mirror frames and other parts as well as to what extent the incident end surface are made thick and wide without departing from the purport of this invention. For instance, the incident end surface of the edge light panel may be made rough; the non-incident end surface side of the edge light panel may be subject to mirror finish; the number, spacing and dot percent of the dots forming diffused reflection on the edge light panel may be varied, or alternatively the dots may be substituted by a linear form diffused reflection pattern; the diffused reflection pattern may be formed by some suitable means such as molding, etching or shot blasting other than screen printing; and a flat or curved form of single edge light panel may be used.

According to the present invention constructed as mentioned above, the virtual image of the linear form light source formed on the reflection mirror surface can be used as an incident light source with said linear form light source, so that the intensity of illumination can be increased twice or more as that achieved by conventional light-focusing systems. Thus, while achieving the same thinness and power saving as such focusing systems, it is possible to increase the intensity of illumination, so that the present arrangement can be used as a liquid crystal backlight for a color liquid crystal display panel.

The present invention can also provide an edge light illuminator arrangement which, because of being relatively simple in structure, is (1) most unlikely to malfunction (2) cost much less to manufacture and (3) works stably over an extended period of time.

According to this invention, a further luminance increase can be achieved by making use of the spacing zone and by opposing or placing in planar alignment with that zone one of the linear form light source or pseudo-light source.

The present invention thus makes it possible to achieve a drastic luminance increase simply and easily.

What is claimed is:

1. An incident light supply device for an edge light panel having a front surface and a back surface and an incident end surface side, comprising:
   a linear form light source located on the incident end surface side of the edge light panel;
   a reflection mirror spaced from said linear form light source so as to form a mirror reflection pseudo-light source of said linear form light source, said reflection mirror being located at a selected angle relative to the edge light panel in a position displaced from alignment with said linear form light source; and
   a spacing zone adjacent to the back surface of said edge light panel; one of said linear form light source and said pseudo-light source being in substantially planar alignment with said spacing zone adjacent to the back surface of the edge light panel.

2. A device as set forth in claim 1, wherein the reflection mirror is arranged in a plurality of planes located adjacent to one another.

3. A device as set forth in claim 2, wherein one of said linear form light source and said pseudo-light source is provided in substantially planar alignment with the incident end surface side of said edge light panel.

4. A device as set forth in claim 2, wherein said reflection mirror includes a mirror frame of curved sectional shape, said mirror frame terminating at an edge of the incident end surface side of said edge light panel.

5. A device as set forth in claim 1, wherein one of said linear form light source and said pseudo-light source is provided in substantially planar alignment with the incident end surface side of the edge light panel.

6. A device as set forth in claim 1, wherein said reflection mirror includes a mirror frame of curved sectional shape, said mirror frame terminating at an edge of the incident end surface side of said edge light panel.

7. A device as set forth in claim 1, wherein the reflection mirror is located in a plurality of spaced-apart planes.

8. A device as set forth in claim 2, wherein said reflection mirror includes a mirror frame of curved sectional shape, said mirror frame terminating at an edge of the incident end surface side of said edge light panel.

9. A device for improving the illuminance of an edge light panel, including a transparent substrate having a diffused reflection pattern formed therein, said device comprising:
   a repeatedly reflecting sheet including a reflection base having light-transmitting portions, said reflection base being stacked on said edge light panel so as to repeatedly reflect light diffusively reflected by the diffused reflection pattern from said edge light panel, said light-transmitting portions comprising a dot array of minuscule light-transmitting elements which are through-holes in said reflection base allowing the passage of light.

10. The device as set forth in claim 9, wherein said reflection base is a mirror sheet.

11. The device set forth in claim 10, wherein said light-transmitting elements are substantially uniformly distributed on said reflection base to provide for substantially uniform diffuse reflection of light.

12. The device set forth in claim 9, wherein said reflection base is selected from a group of structures consisting of a transparent mirror, a semitransparent mirror and a white surface.

13. A device for improving the illuminance of an edge light panel, including a transparent substrate having a diffused reflection pattern formed..therein, said device comprising:
   a repeatedly reflecting sheet including a reflection base having light-transmitting portions, said reflection base being stacked on said edge light panel so as to repeatedly reflect light diffusively reflected by the diffused reflection pattern from said edge light panel, said light-transmitting portions comprising a linear array of light-transmitting elements which are through-holes in said reflection base allowing the passage of light.

14. The device as set forth in claim 13, wherein said reflection base is a mirror sheet.

15. The device set forth in claim 14, wherein said light-transmitting elements are substantially uniformly distributed on said reflection base to provide for substantially uniform diffuse reflection of light.

16. The device set forth in claim 13, wherein said light-transmitting elements are substantially uniformly distributed on said reflection base to provide for substantially uniform diffuse reflection of light.

* * * * *